US012626553B1

(12) United States Patent
Espadas

(10) Patent No.: US 12,626,553 B1
(45) Date of Patent: May 12, 2026

(54) SYSTEMS AND METHODS FOR PROVISIONING SECURE RECEIPTS IN COMPACT ENVIRONMENTS

(71) Applicant: Abraham E. Espadas, Santa Ana, CA (US)

(72) Inventor: Abraham E. Espadas, Santa Ana, CA (US)

( * ) Notice: Subject to any disclaimer, the term of this patent is extended or adjusted under 35 U.S.C. 154(b) by 0 days.

(21) Appl. No.: 18/934,232

(22) Filed: Oct. 31, 2024

(51) Int. Cl.
*G07C 9/00* (2020.01)
*G06Q 10/0833* (2023.01)

(52) U.S. Cl.
CPC ..... *G07C 9/00896* (2013.01); *G06Q 10/0833* (2013.01); *G07C 2009/0092* (2013.01)

(58) Field of Classification Search
CPC ........ G07C 9/00896; G07C 2009/0092; G06Q 10/0833
See application file for complete search history.

(56) References Cited

U.S. PATENT DOCUMENTS

2001/0050615 A1 * 12/2001 Kucharczyk .............. G07F 7/10
340/568.1
2013/0261792 A1 * 10/2013 Gupta ................... G05B 15/02
700/232

2020/0258334 A1 * 8/2020 Flynn .................... H04L 9/0891
2022/0031105 A1 * 2/2022 Newcomb .............. A47G 29/14

OTHER PUBLICATIONS

Gege Yang, Parcel Locker Location Based on a Bilevel Programming Model, 2020, p. 1-4 (Year: 2020).*

* cited by examiner

*Primary Examiner* — Ibrahim N El-Bathy
(74) *Attorney, Agent, or Firm* — Mooney IP; Pierce Mooney

(57) ABSTRACT

A secure delivery system is designed for receiving packages at a premises, featuring a housing that can be mounted on various structures such as a front door, wall, or garage door. The system includes an electronic locking mechanism, a motorized door housing, and a controller that processes authentication data to manage access. It also incorporates a collapsible collection bag and a communication interface for interaction with remote user devices. Additionally, the system can be manually controlled via commands from a remote device and includes a sensor to detect package presence. The housing is adaptable to different structure thicknesses, and the locking mechanism is equipped with a keypad and RFID reader. The system is powered by a rechargeable battery, ensuring continuous operation.

20 Claims, 11 Drawing Sheets

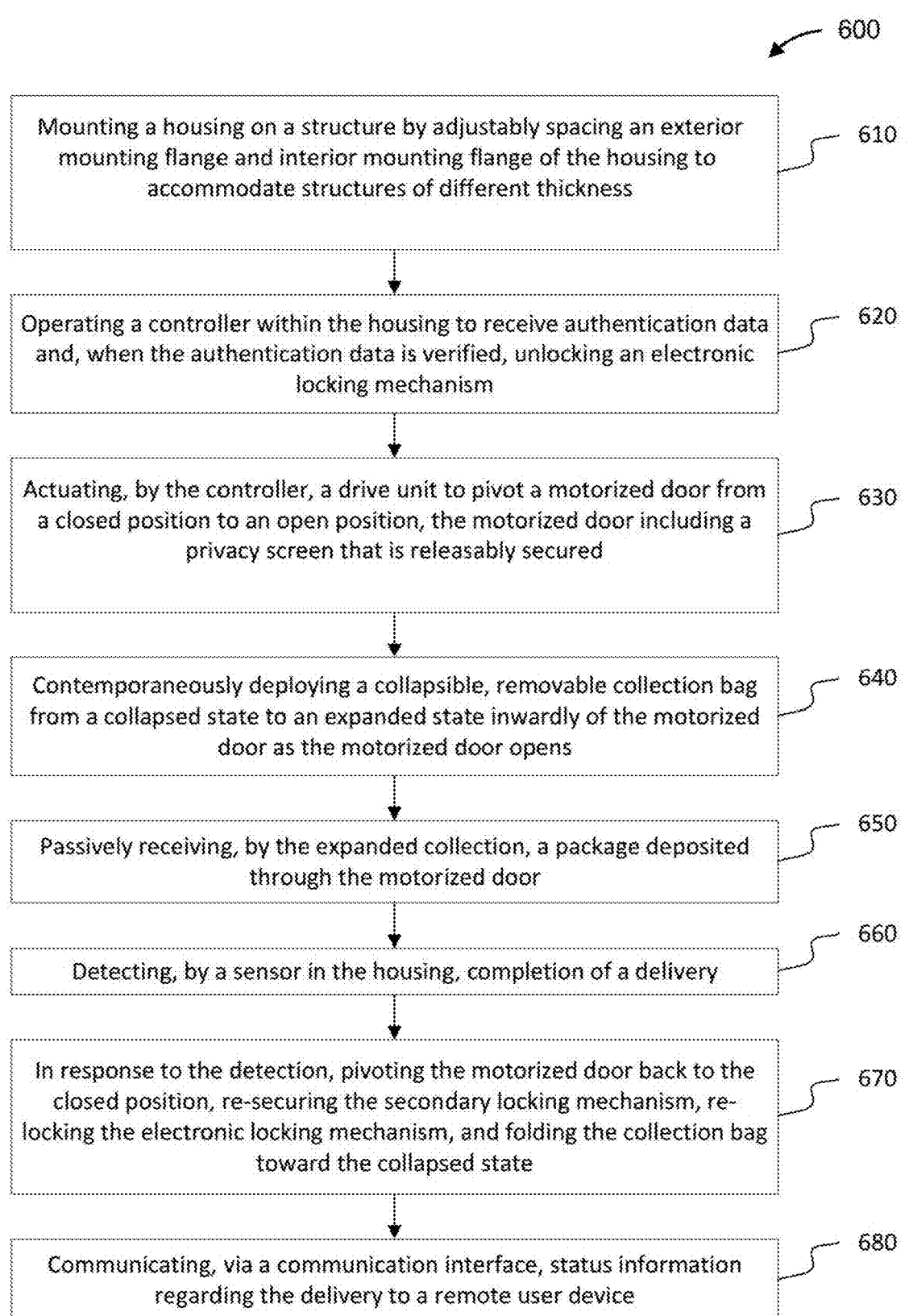

600

Mounting a housing on a structure by adjustably spacing an exterior mounting flange and interior mounting flange of the housing to accommodate structures of different thickness — 610

Operating a controller within the housing to receive authentication data and, when the authentication data is verified, unlocking an electronic locking mechanism — 620

Actuating, by the controller, a drive unit to pivot a motorized door from a closed position to an open position, the motorized door including a privacy screen that is releasably secured — 630

Contemporaneously deploying a collapsible, removable collection bag from a collapsed state to an expanded state inwardly of the motorized door as the motorized door opens — 640

Passively receiving, by the expanded collection, a package deposited through the motorized door — 650

Detecting, by a sensor in the housing, completion of a delivery — 660

In response to the detection, pivoting the motorized door back to the closed position, re-securing the secondary locking mechanism, re-locking the electronic locking mechanism, and folding the collection bag toward the collapsed state — 670

Communicating, via a communication interface, status information regarding the delivery to a remote user device — 680

FIG. 6

SYSTEMS AND METHODS FOR PROVISIONING SECURE RECEIPTS IN COMPACT ENVIRONMENTS

REFERENCE TO RELATED APPLICATIONS

This application claims priority from U.S. provisional application Ser. No. 63/546,725, filed Oct. 31, 2023, which is incorporated by reference (and/or filed herewith).

BACKGROUND OF THE INVENTION

Technical Field

The present disclosure generally relates to smart home security systems, specifically focusing on secure reception solutions that integrate with existing home infrastructure and provide remote management capabilities.

Description of the Related Art

In recent years, the rise of e-commerce has significantly increased the volume of package deliveries to residential and commercial properties. This surge in online shopping has led to a growing demand for secure and convenient delivery solutions that can accommodate the busy lifestyles of modern consumers. Traditional delivery methods often require recipients to be present at the time of delivery, which can be inconvenient and impractical for many individuals who are not home during standard delivery hours. Additionally, the prevalence of package theft, commonly referred to as 'porch piracy,' has become a major concern for homeowners, prompting the need for innovative solutions that can ensure the safe receipt of packages without compromising security.

The challenge lies in developing a system that not only secures packages but also integrates seamlessly with existing home infrastructure. Many homeowners are reluctant to make significant modifications to their properties, such as cutting openings in doors or walls, to accommodate new delivery systems. Therefore, there is a pressing need for a solution that is both easy to install and compatible with a variety of home designs. Furthermore, as smart home technology continues to evolve, there is an opportunity to leverage these advancements to create a more integrated and user-friendly delivery experience. This context sets the stage for innovations that address these challenges by providing secure, convenient, and technologically advanced solutions for package delivery.

SUMMARY OF THE INVENTION

In accordance with certain aspects, a secure delivery system is provided for receiving packages at a premises. The system comprises a housing configured to be mounted on a structure, an electronic locking mechanism operable to selectively allow access to the housing, a motorized door housing integrated with the housing, a controller configured to receive authentication data and to control the electronic locking mechanism based on the authentication data, a collapsible collection bag within the housing, and a communication interface configured to communicate with a remote user device.

In accordance with other aspects, the system is mounted on a structure that includes a front door, a wall, or a garage door, providing flexibility in installation locations.

In yet other aspects, the motorized door housing comprises a privacy screen that prevents visual access to the interior of the premises, enhancing security and privacy.

In further aspects, the privacy screen is coupled to a secondary locking mechanism controlled based on the authentication data, adding an additional layer of security.

In accordance with additional aspects, the communication interface is configured to receive commands from the remote user device to manually control the motorized door housing, allowing for remote operation and control.

In other aspects, the system further comprises a sensor configured to detect the presence of a package within the collection bag, providing confirmation of package delivery.

In yet other aspects, the housing includes adjustable flanges to accommodate different thicknesses of the structure, ensuring a secure fit regardless of the installation surface.

In accordance with further aspects, the electronic locking mechanism includes a keypad and an RFID reader, offering multiple methods of authentication for access control.

In other aspects, the collapsible collection bag is removable, allowing for easy retrieval and replacement of the bag.

In yet other aspects, the motorized door housing and the electronic locking mechanism are powered by a rechargeable battery, ensuring continued operation even in the event of a power outage.

In accordance with certain aspects, a method is provided for securely receiving packages at a premises. The method involves mounting a housing on a structure, receiving authentication data from a delivery agent at a controller, controlling an electronic locking mechanism to selectively allow access to the housing based on the authentication data, receiving a package into a collapsible collection bag within the housing, and communicating with a remote user device to notify a user of the status of package delivery.

In accordance with other aspects, the method includes mounting the system on a structure such as a front door, a wall, or a garage door, providing versatility in installation.

In yet other aspects, the method includes preventing visual access to the interior of the premises by including a privacy screen with the motorized door housing, enhancing security.

In further aspects, the method includes controlling a secondary locking mechanism coupled to the privacy screen based on the authentication data, providing an additional security measure.

In accordance with additional aspects, the method includes receiving commands from the remote user device to manually control the motorized door housing via the communication interface, allowing for remote management.

In other aspects, the method includes detecting the presence of a package within the collection bag using a sensor, confirming delivery.

In yet other aspects, the method includes adjusting flanges of the housing to accommodate different thicknesses of the structure, ensuring a proper fit.

In accordance with further aspects, the method includes entering a code on a keypad and detecting an authorized RFID tag with an RFID reader as part of the electronic locking mechanism, providing secure access control.

In other aspects, the method includes the collapsible collection bag being removable, facilitating easy handling of delivered packages.

In yet other aspects, the method includes the motorized door housing and the electronic locking mechanism being powered by a rechargeable battery, ensuring reliability during power interruptions.

BRIEF DESCRIPTION OF THE FIGURES

FIG. 6 depicts some aspects of a system for provisioning secure receipts.

DETAILED DESCRIPTION

Figure 1:
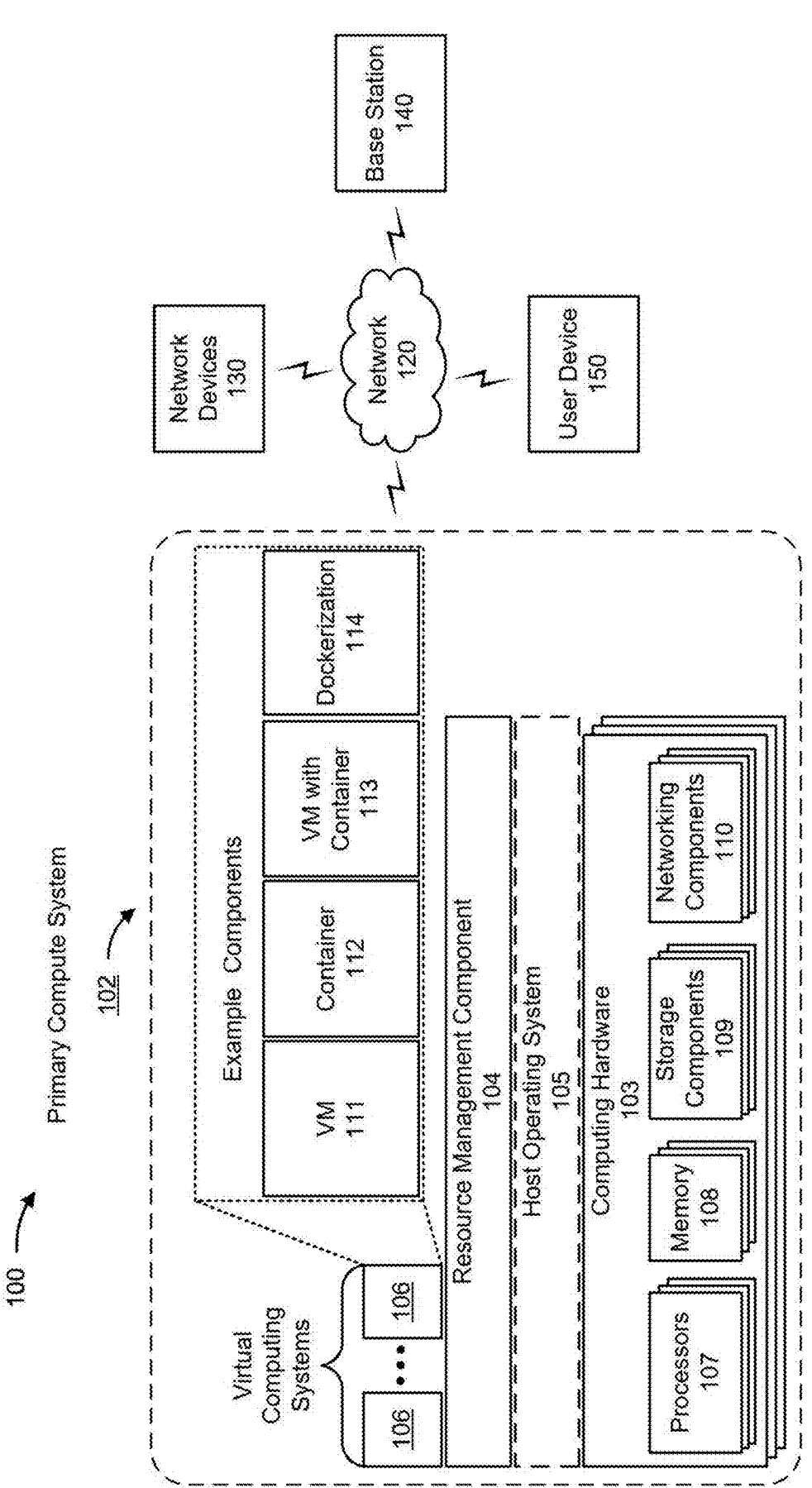
FIG. 1 is a diagram of an example environment in which systems and/or methods described herein may be implemented.

In the following detailed description, numerous specific details are set forth by way of examples to provide a thorough understanding of the relevant teachings. However, it should be apparent that the present teachings may be practiced without such details. In other instances, well-known structures, functions, methods, procedures, components, and/or circuitry have been described at a relatively high level, without detail, to avoid unnecessarily obscuring aspects of the present teachings.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word; any of the items in the list, all of the items in the list and any combination of the items in the list. When the word "each" is used to refer to an element that was previously introduced as being at least one in number, the word "each" does not necessarily imply a plurality of the elements, but can also mean a singular element.

As noted, existing package receipt provisioning platforms are often ineffective as they do not integrate with existing address entry points, lack secondary privacy considerations, and/or lack proper digital authentication and authorization methods and systems. To address the challenges associated with traditional methods of provisioning the secure receipt of various deliveries, techniques are described that implement SYSTEMS AND METHODS FOR PROVISIONING SECURE RECEIPTS IN COMPACT ENVIRONMENTS.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various processes described herein may be implemented by appropriately programmed general purpose computers, special purpose computers, and computing devices. Typically, a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogeneous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes, Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on an Intel® or AMD® processor, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
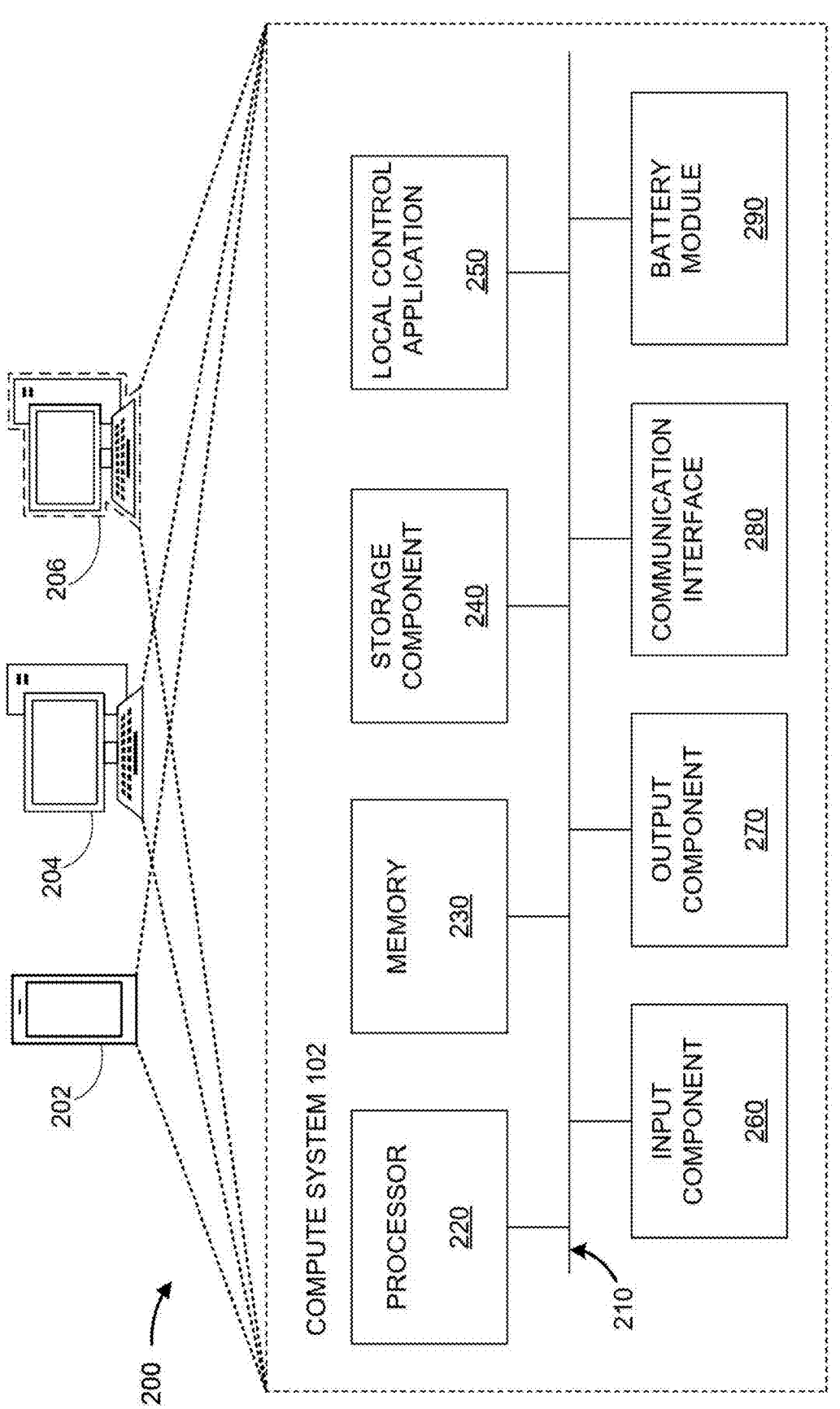
FIG. 2 is a diagram of components of a compute system, according to an example of the present disclosure.

With reference to the figures and in particular, with reference to FIG. 1 and FIG. 2, these figures are example diagrams of data processing environments in which illustrative embodiments may be implemented, FIG. 1 and FIG. 2 are only examples and are not intended to assert or imply any limitation with regard to the environments in which different embodiments may be implemented. A particular implementation may make many modifications to the depicted environments based on the following description.

FIG. 1 is a diagram of an example environment 100 in which systems and/or methods described herein may be implemented. As shown in FIG. 1, the environment 100 may execute within a cloud computing system 102. The cloud computing system 102 may include one or more elements 103-113, as described in more detail below. As further shown in FIG. 1, the environment 100 may include a network 120, a first user device 130, and/or a base station 140. Devices and/or elements of the environment 100 may interconnect via wired connections and/or wireless connections. It is important to note that first user device 130, as described herein, is a user device which may be used by the first user and/or the second user. In the later case, when it is used by the second user, user device 130 may also be called a second user device 130. For purposes of convenience in reading this description, the embodiment of the user device 130 as a first user device will be described, but it should be understood as interchangeably termed "second user device" at least for the purposes of the disclosures of FIG. 1 and FIG. 2.

The cloud computing system 102 includes computing hardware 103, a resource management component 104, a host operating system (OS) 105, and/or one or more virtual computing systems 106. The resource management component 104 may perform virtualization (e.g., abstraction) of the computing hardware 103 to create the one or more virtual computing systems 106. Using virtualization, the resource management component 104 enables a single computing device (e.g., a computer, a server, and/or the like) to operate like multiple computing devices, such as by creating multiple isolated virtual computing systems 106 from the computing hardware 103 of the single computing device. In this way, the computing hardware 103 can operate more efficiently, with lower power consumption, higher reliability, higher availability, higher utilization, greater flexibility, and lower cost than using separate computing devices.

The computing hardware 103 includes hardware and corresponding resources from one or more computing devices. For example, the computing hardware 103 may include hardware from a single computing device (e.g., a single server) or from multiple computing devices (e.g., multiple servers), such as multiple computing devices in one or more data centers. As shown, the computing hardware 103 may include one or more processors 107, one or more memories 108, one or more storage components 109, and/or one or more networking components 110. Examples of a processor, a memory, a storage component, and a networking component (e.g., a communication component) are described elsewhere herein.

The resource management component 104 includes a virtualization application (e.g., executing on hardware, such as the computing hardware 103) capable of virtualizing the computing hardware 103 to start, stop, and/or manage the one or more virtual computing systems 106. For example, the resource management component 104 may include a hypervisor (e.g., a bare-metal or Type 1 hypervisor, a hosted or Type 2 hypervisor, and/or the like) or a virtual machine monitor, such as when the virtual computing systems 106 are virtual machines 111. Additionally, or alternatively, the resource management component 104 may include a container manager, such as when the virtual computing systems 106 are containers 112. In some implementations, the resource management component 104 executes within and/or in coordination with a host operating system 105.

A virtual computing system 106 includes a virtual environment that enables cloud-based execution of operations and/or processes described herein using computing hardware 103. As shown, the virtual computing system 106 may include a virtual machine 111, a container 112, a hybrid environment 113 that includes a virtual machine and a container, an environment which includes Docker-like file-systems or other possible Dockerization 114 with a VM or other computing hardware allocation, and/or the like. A virtual computing system 106 may execute one or more applications using a file system that includes binary files, software libraries, and/or other resources required to execute applications on a guest operating system (e.g., within the virtual computing system 106) or the host operating system 105.

The network 120 includes one or more wired and/or wireless networks. For example, the network 120 may include a cellular network, a public land mobile network (PLMN), a local area network (LAN), a wide area network (WAN), a satellite network, a private network, the Internet, and/or the like, and/or a combination of these or other types of networks. The network 120 enables communication among the devices of the environment 100.

First user device 130 may be possessed by a first user and includes one or more devices capable of receiving, generating, storing, processing, and/or providing information, as described elsewhere herein. First user device 130 may include a communication device and/or a computing device. For example, first user device 130 may include a wireless communication device, a mobile phone, a user equipment (UE), a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The base station 140 may support, for example, a cellular radio access technology (RAT). The base station may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the base station 140. The first user device 130 may transfer traffic between the base station 140 (e.g., using a cellular RAT), one or more base stations (e.g., using a wireless interface or a backhaul interface, such as a wired backhaul interface), and/or a core network. The first user device 130 may provide one or more cells that cover geographic areas.

The second user device 150 may be possessed by a second user and includes one or more devices capable of receiving, generating, storing, processing, and/or providing information, as described elsewhere herein. Second user device 150 may include a communication device and/or a computing device, and may be connected to, or embedded anywhere within, a vehicle or other equipment known to be utilized in the transportation industry. For example, second user device 150 may include a wireless communication device, a mobile phone, a vehicle computer system, a mobile printer, a calculator, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

FIG. 2 is a diagram of components of first user device 130, according to an example of the present disclosure. First user device 130 may include a bus 210, a processor 220; a memory 230, a storage component 240, an input component 260, an output component 260, a communication interface 280, and battery module 290.

Bus 210 includes a component that permits communication among the components of First user device 130. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 220 includes one or more processors capable of being programmed to perform a function. Memory 230 may include one or more memories such as a random access memory (RAM), a read only memory (ROM), and/or another type of dynamic or static storage device (e.g., a flash memory, a magnetic memory, and/or an optical memory) that stores information and/or instructions for use by processor 220. In some embodiments, a non-transitory computer-readable medium stores instructions that, when executed by a processor, cause the processor to perform various functions.

Storage component 240 stores information and/or software related to the operation and use of First user device 130. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 260 includes a component that permits first user device 130 to receive information, such as via user input (e.g., a touch screen display, a keyboard, a keypad, a mouse, a button, a switch, and/or a microphone). Additionally, or alternatively, input component 260 may include a sensor for sensing information (e.g., a GPS component, an accelerometer, a gyroscope, and/or an actuator). Output component 260 includes a component that provides output information from first user device 130 (e.g., a display, a speaker, a user interface, and/or one or more light-emitting diodes (LEDs)), Output component 260 may include a display providing a GUI, such as interface 300. Input component 260 and output component 260 may be combined into a single component, such as a touch responsive display, also known as a touchscreen.

Communication interface 280 includes a transceiver-like component (e.g., a transceiver and/or a separate receiver and transmitter) that enables first user device 130 to communicate with other devices, such as via a wired connection, a wireless connection, or a combination of wired and wireless connections. Communication interface 280 may permit first user device 130 to receive information from another device and/or provide information to another device. Communication interface 280 may include one or more RFFEs (radio frequency front ends) with antennae circuitry and RF (radio frequency) filters which may be variable power and/or purpose adapted for various communication frequencies, standards, links, and distances. For example, communication interface 280 may include an Ethernet interface, an optical interface, a coaxial interface, an infrared interface, an RF interface, a universal serial bus (USB) interface, a Wi-Fi interface, a cellular network interface, or the like.

Battery module 290 is connected along bus 210 to supply power to processor 220, memory 230, and internal components of first user device 130. Battery module 290 may supply power during field measurements by first user device 130. Battery module 290 permits First user device 130 to be a portable integrated device for conducting field measurements of propagation delay in a RAN.

First user device 130 may perform one or more processes described herein. First user device 130 may perform these processes by processor 220 executing software instructions stored by a non-transitory computer-readable medium, such as memory 230 and/or storage component 240. A computer-readable medium is defined herein as a non-transitory memory device. A memory device includes memory space within a single physical storage device or Software instructions may be read into memory 230 and/or storage component 240 from another computer-readable medium or from another device via communication interface 280. When executed, software instructions stored in memory 230 and/or storage component 240 may instruct processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, first user device 130 may include additional components, fewer components, different components, or differently arranged components than those shown in FIG. 2, 200. Additionally, or alternatively, a set of components (e.g., one or more components) of first user device 130 may perform one or more functions described as being performed by another set of components of first user device 130.

FIG. 2 is a diagram of components of first user device 130, according to an example of the present disclosure. First user device 130 may include a bus 210, a processor 220, a memory 230, a storage component 240, an input component 260, an output component 260, a communication interface 280, and battery module 290.

Bus 210 includes a component that permits communication among the components of First user device 130. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 220 includes one or more processors capable of being programmed to perform a function. According to an example, processor 220 is processor 220 of FIG. 6. Memory 230 may include one or more memories such as a random-access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of First user device 130. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Related, local control application 250 may be a user interface or application layer software which enables, by proper firmware protocols, the control of various compute system components and interconnections.

Input component 260 includes a component that permits first user device 130 to receive information, such as via user input (e.g., a touch screen display, a keyboard, a keypad, a mouse, a button, a switch, and/or a microphone). Additionally, or alternatively, input component 260 may include a sensor for sensing information (e.g., a GPS component, an accelerometer, a gyroscope, and/or an actuator), Output component 260 includes a component that provides output information from first user device 130 (e.g., a display, a speaker, a user interface, and/or one or more light-emitting diodes (LEDs)). Output component 260 may include a display providing a GUI, such as interface 300. Input component 260 and output component 260 may be combined into a single component, such as a touch responsive display, also known as a touchscreen.

Communication interface 280 includes a transceiver-like component (e.g., a transceiver and/or a separate receiver and transmitter) that enables first user device 130 to communicate with other devices, such as via a wired connection, a wireless connection, or a combination of wired and wireless connections. Communication interface 280 may include one or more short range communication interface modules and medium/long range communication interface modules, and may permit first user device 130 to receive information from another device and/or provide information to another device. For example, communication interface 280 may include an Ethernet interface, an optical interface, a coaxial interface, an infrared interface, an RF interface, a universal serial bus (USB) interface, a Wi-Fi interface, a cellular network interface, or the like.

Battery module 290 is connected along bus 210 to supply power to processor 220, memory 230, and internal components of first user device 130. Battery module 290 permits First user device 130 to be a portable integrated device for conducting field measurements of propagation delay in a RAN.

First user device 130 may perform one or more processes described herein. First user device 130 may perform these processes by processor 220 executing software instructions stored by a non-transitory computer-readable medium, such as memory 230 and/or storage component 240. A computer-readable medium is defined herein as a non-transitory memory device. A memory device includes memory space within a single physical storage device or Software instructions may be read into memory 230 and/or storage component 240 from another computer-readable medium or from another device via communication interface 280. When executed, software instructions stored in memory 230 and/or storage component 240 may instruct processor 220 to perform one or more processes described herein. Additionally, or alternatively, hardwired circuitry may be used in place of or in combination with software instructions to perform one or more processes described herein. Example embodiments second user device 150 may include a mobile device/user equipment (UE) 202, a personal computer 204, or a virtual computing system 206 which may include various implementations such as those of 106. Thus, implementations described herein are not limited to any specific combination of hardware circuitry and software.

The number and arrangement of components shown in FIG. 2 are provided as an example. In practice, first user device 130 may include additional components, fewer components, different components, or differently arranged components than those shown in FIG. 2. Additionally, or alternatively, a set of components (e.g., one or more components) of first user device 130 may perform one or more functions described as being performed by another set of components of first user device 130.

Figure 3:
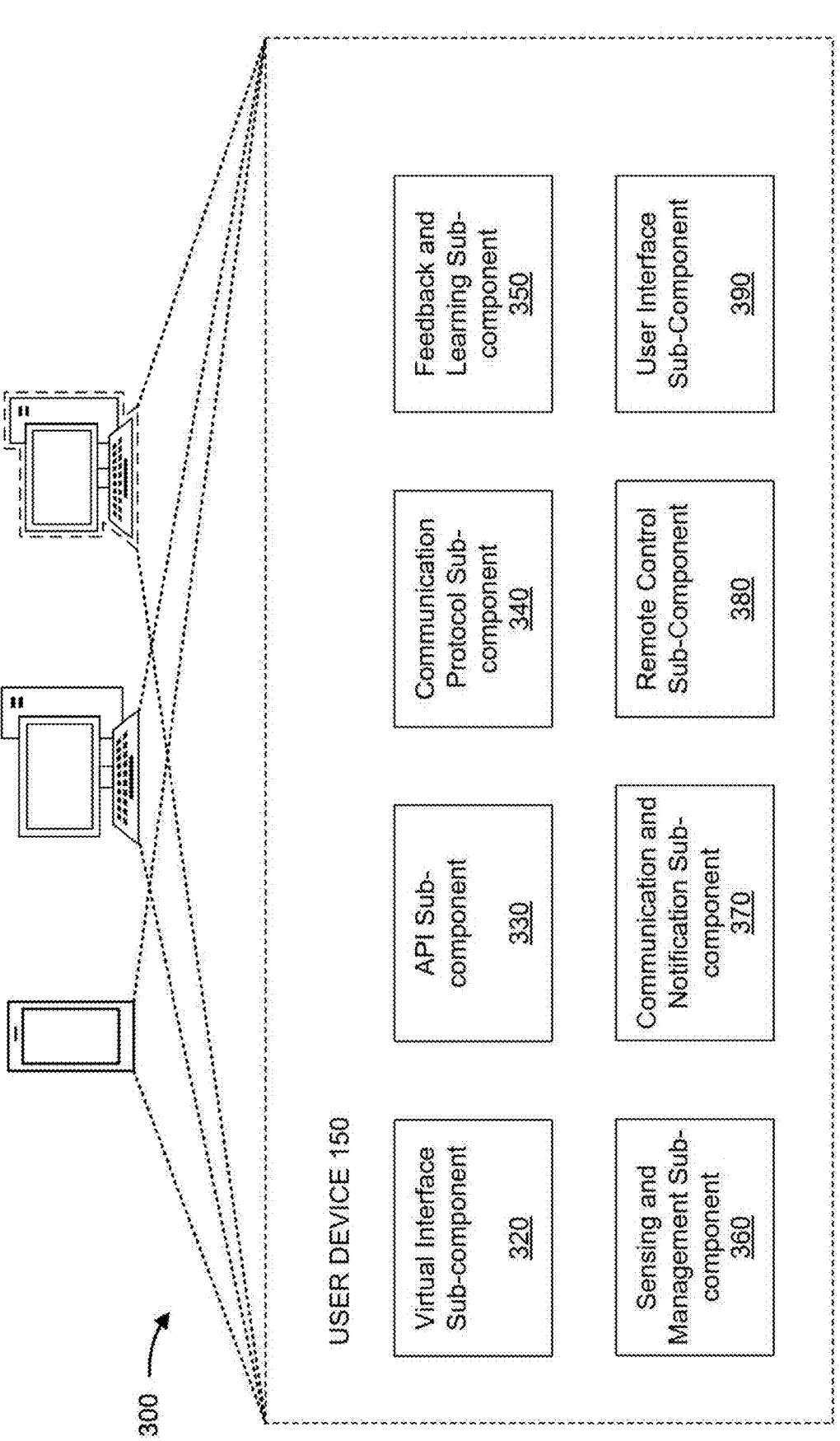
FIG. 3 is a diagram of components of a user device, according to an example of the present disclosure.

In certain aspects, FIG. 3 illustrates a user device 150 that may be integral to the secure delivery system for provisioning secure receipts in compact environments. This device may include several sub-components that facilitate communication and control within the system. The virtual interface sub-component 320 may provide a user-friendly interface, allowing users to manage settings and receive notifications related to package delivery.

In some aspects, the API sub-component 330 may enable integration with external applications, ensuring seamless data exchange and functionality extension. This integration may be crucial for maintaining interoperability with various platforms and enhancing the system's adaptability.

In various aspects, the communication protocol sub-component 340 may establish and maintain secure communication channels between the user device and the delivery system. This ensures that authentication data and control commands are transmitted reliably, supporting the system's security and efficiency.

In several aspects, the feedback and learning sub-component 350 may gather user interaction data to improve system performance and user experience over time. This component may employ machine learning algorithms to adapt to user preferences and optimize operations.

In other aspects, the sensing and management sub-component 360 may monitor the status of the delivery system, including package detection and system health. It may work in conjunction with the communication and notification sub-component 370, which alerts users to package delivery status and system updates.

In many aspects, the remote control sub-component 380 may allow users to operate the motorized door housing and electronic locking mechanism from a distance, providing flexibility and convenience. This feature may be particularly useful for managing deliveries when users are not physically present.

In certain aspects, the user interface sub-component 390 may offer a comprehensive dashboard for users to access all system functionalities, ensuring a cohesive and intuitive user experience. Together, these components form a robust framework that supports the secure and efficient operation of the delivery system, aligning with the claims and enhancing the system's overall functionality.

Figure 4:
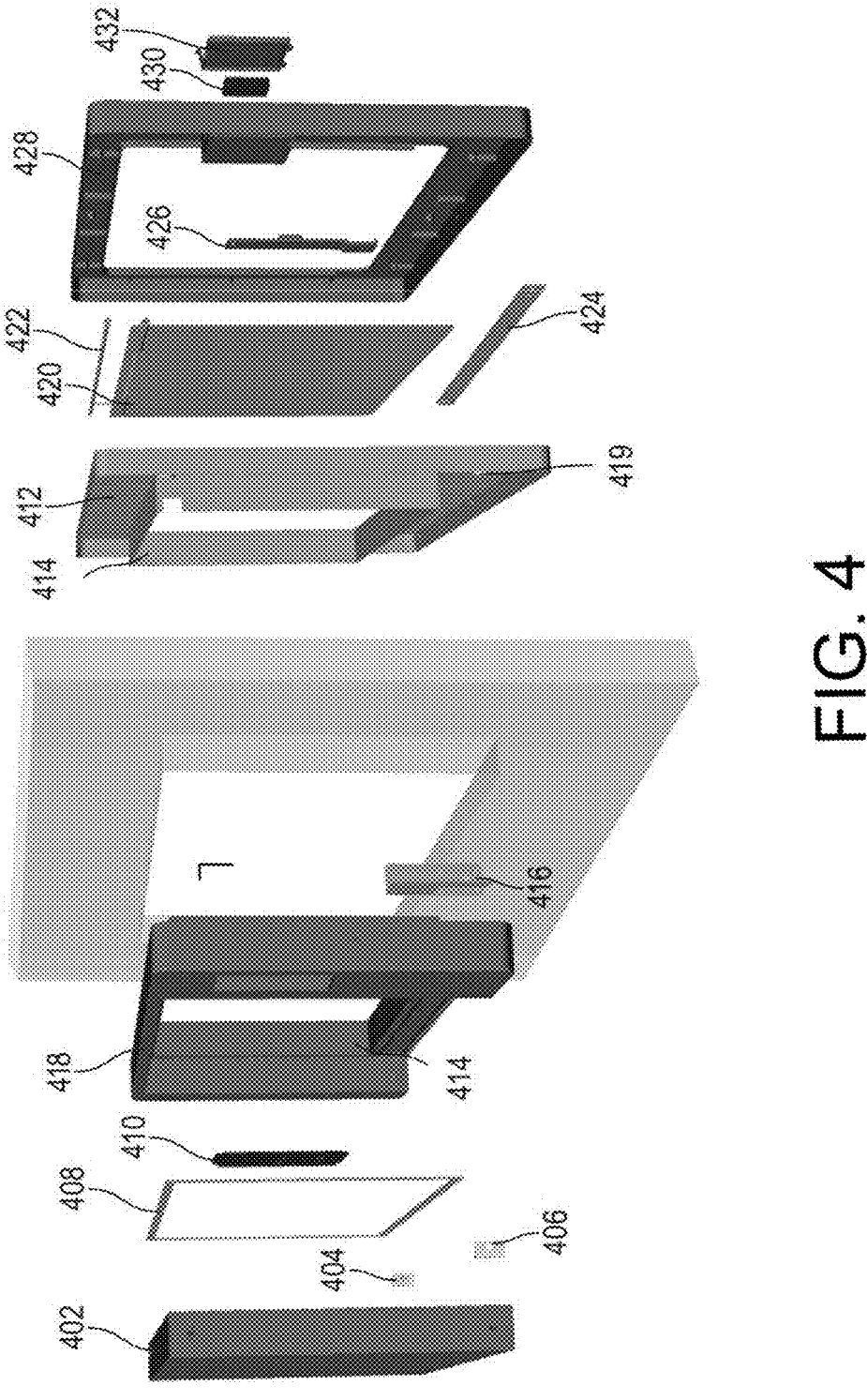
FIG. 4 depicts an exploded view of an example system for provisioning secure receipts.

Referring to FIG. 4, which illustrates a secure delivery system for receiving packages at a premises, the system may include a housing 412 configured to be mounted on a structure such as a front door, wall, or garage door. In certain aspects, the housing 412 may be constructed from durable materials such as steel or reinforced plastic to ensure security and longevity. The housing 412 may include adjustable flanges 414 to accommodate different thicknesses of the structure, allowing for versatile installation options.

As further shown in FIG. 4, a longitudinal fastener channel 419 is formed in the mounting bracket and is dimensioned to receive a bolt that extends from the motorized door housing 418 and threads into a captive insert or boss on the interior side of the housing. Channel 419 guides the bolt during installation, permits limited fore-and-aft adjustment, and when the bolt is tightened, draws the motorized door housing and housing together to ensure proper alignment and a secure fit. The housings brought together to the surface from the surface's interior side include both housing 412 and the rest of the assembly to the innermost assembly part, the communication interface 428.

In some aspects, the system may feature an electronic locking mechanism 416 operable to selectively allow access to the housing 412. This mechanism may include a keypad 430 and an RFID reader 432, enabling secure access through authentication data. The electronic locking mechanism 416 may be powered by a rechargeable battery 406, ensuring continuous operation even during power outages.

In various aspects, a motorized door housing 418 is integrated with the housing 412. The motorized door housing 418 may include a privacy screen 420 that prevents visual access to the interior of the premises, enhancing security. The privacy screen 420 may be coupled to a secondary locking mechanism 422 controlled based on the authentication data received by the controller 424. This configuration may provide an additional layer of security by ensuring that the privacy screen 420 only opens when authorized.

In several aspects, the system may include a collapsible collection bag 426 within the housing 412. The collection bag 426 may be removable, allowing for easy retrieval of packages and maintenance. The bag 426 may be made from flexible, durable materials such as nylon or polyester, capable of accommodating various package sizes.

In other aspects, the system may feature a communication interface 428 configured to communicate with a remote user device. This interface 428 may receive commands from the user device to manually control the motorized door housing 418 and provide notifications regarding the status of package delivery. The communication interface 428 may utilize wireless protocols such as Wi-Fi or Bluetooth to ensure seamless connectivity.

In many aspects, the system may further comprise a sensor 404 configured to detect the presence of a package within the collection bag 426. This sensor 404 may trigger the motorized door housing 418 to close once a package is detected, ensuring the security of the delivered items. The sensor 404 may operate using infrared or ultrasonic technology to accurately detect packages.

In certain aspects, the controller 424 may be configured to receive authentication data from a delivery agent, such as a unique code entered on the keypad 430 or an RFID tag detected by the reader 432. The controller 424 may then control the electronic locking mechanism 416 to allow access to the housing 412 based on the received data.

In some aspects, the system may include a mounting bracket 402 to facilitate the installation of the housing 412 on various structures. The bracket 402 may be adjustable to ensure a secure fit and may be constructed from materials such as aluminum or stainless steel for durability.

In various aspects, the system may be designed to integrate with existing home automation systems, allowing users to monitor and control the secure delivery system remotely. This integration may be achieved through APIs or compatible software platforms, providing users with enhanced control and convenience.

In several aspects, the system may be adaptable to different environmental conditions, with weather-resistant features such as seals and coatings to protect against moisture and dust. These features may ensure reliable operation in various climates and settings.

In other aspects, the system may include a user-friendly interface on the remote device, allowing users to easily configure settings, receive alerts, and manage access permissions. This interface may be accessible through a mobile app or web portal, providing flexibility and ease of use.

In many aspects, the secure delivery system may address major real-world problems such as package theft and delivery security, offering a competitive advantage over existing technologies. The system's innovative features, such as the privacy screen 420 and communication interface 428, may provide enhanced security and user convenience.

In conclusion, the secure delivery system illustrated in FIG. 4 may offer a comprehensive solution for secure package delivery, with versatile installation options, advanced security features, and seamless integration with modern technology. The system's adaptability and user-friendly design may make it suitable for a wide range of applications, from residential to commercial settings.

Figure 5:
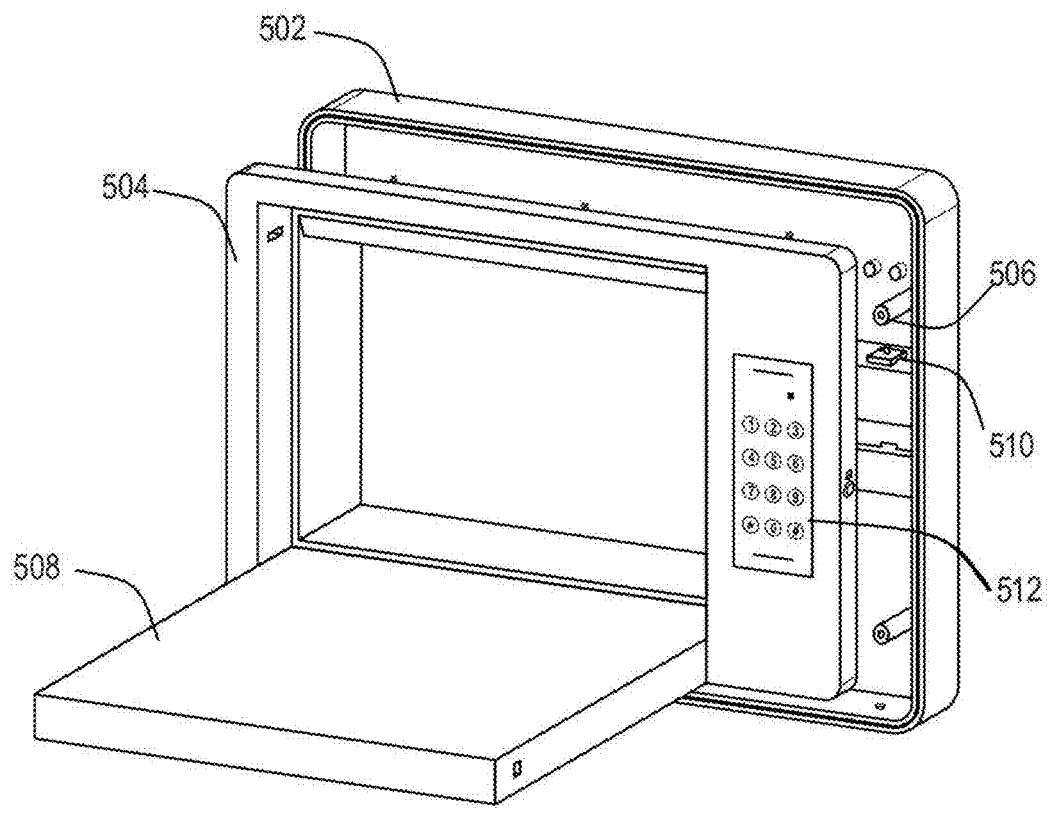
FIG. 5 depicts an assembled view of an example system for provisioning secure receipts on which illustrative embodiments may be implemented.

In certain aspects shown in FIG. 5, the secure delivery system for receiving packages at a premises, as depicted in the figure, includes a housing 502 configured to be mounted on a structure. This housing 502 may be designed to accommodate various mounting surfaces, such as a front door, wall, or garage door, providing flexibility in installation. The housing 502 may be constructed from durable materials, such as metal or reinforced plastic, to ensure security and longevity.

As seen in FIG. 5, opposed flange surfaces on the exterior and interior housing portions are generally planar and can slide past one another in a flush, overlapping relationship. A plurality of fastener channels 506, which are functionally similar and aligned with 419, permit screws or bolts to extend through clearance openings in interior housing 502 and thread into complementary bosses in the external housing portion 504. Tightening screws through fastener channels 506, combined with gravity, incrementally draws the two flange surfaces flush together and sandwiches the housing assembly onto the intervening wall or door panel, achieving a secure, adjustable attachment without the need for a direct fastening or other direct integration into the wall, door, or surface.

In some aspects, the system features an electronic locking mechanism 504 operable to selectively allow access to the housing 502. This locking mechanism 504 may include components such as a solenoid or motorized lock, which can be controlled electronically to secure the housing 502. The locking mechanism 504 may be integrated with a controller 506 that receives authentication data, such as a code or signal, to manage access.

In various aspects, the motorized door housing 508 is integrated with the housing 502 and may be configured to open and close automatically. The motorized door housing 508 may include a privacy screen that prevents visual access to the interior of the premises, enhancing security. The door 508 may be powered by a rechargeable battery, allowing for energy-efficient operation.

In several aspects, the controller 506 is configured to receive authentication data from a delivery agent. This data may be input via a keypad 512 or detected through an RFID reader, enabling the controller 506 to verify access credentials. Upon successful authentication, the controller 506 may activate the electronic locking mechanism 504 to allow access.

In other aspects, the system includes a collapsible collection bag within the housing 502. This bag may be designed to receive packages securely and can be removable for convenience. The collection bag may be made from flexible, durable materials such as nylon or canvas, providing protection for the contents.

In many aspects, the communication interface 510 is configured to communicate with a remote user device. This interface 510 may include wireless communication capabilities, such as Wi-Fi or Bluetooth, to send notifications to a user about the status of package delivery. The interface 510 may also receive commands from the user device to manually control the motorized door housing 508.

In certain aspects, the housing 502 may include adjustable flanges to accommodate different thicknesses of the structure on which it is mounted. These flanges may be adjustable via screws or sliding mechanisms, allowing for a secure fit on various surfaces.

In some aspects, the system may further comprise a sensor configured to detect the presence of a package within the collection bag. This sensor may be an infrared or weight sensor, providing feedback to the controller 506 to confirm delivery.

In various aspects, the electronic locking mechanism 504 may include both a keypad 512 and an RFID reader, offering multiple methods for authentication. The keypad 512 may be used to enter a code, while the RFID reader can detect authorized tags, providing flexibility in access control.

In several aspects, the motorized door housing 508 and the electronic locking mechanism 504 are powered by a rechargeable battery. This battery may be housed within the system and can be recharged via an external power source, ensuring continuous operation.

In other aspects, the method for securely receiving packages at a premises involves mounting the housing 502 on a structure, receiving authentication data at the controller 506, and controlling the electronic locking mechanism 504 to allow access. The method may further include receiving a package into the collapsible collection bag and communicating with a remote user device to notify the user of the delivery status.

In many aspects, the system's design and components are interrelated to provide a secure and efficient package delivery solution. The integration of electronic controls, secure locking mechanisms, and communication interfaces ensures that the system can be easily managed and monitored by users, offering a comprehensive solution for secure package receipt.

Referring to FIG. 6, a placeholder flowchart with text from the independent method claim is asserted.

Figure 7:
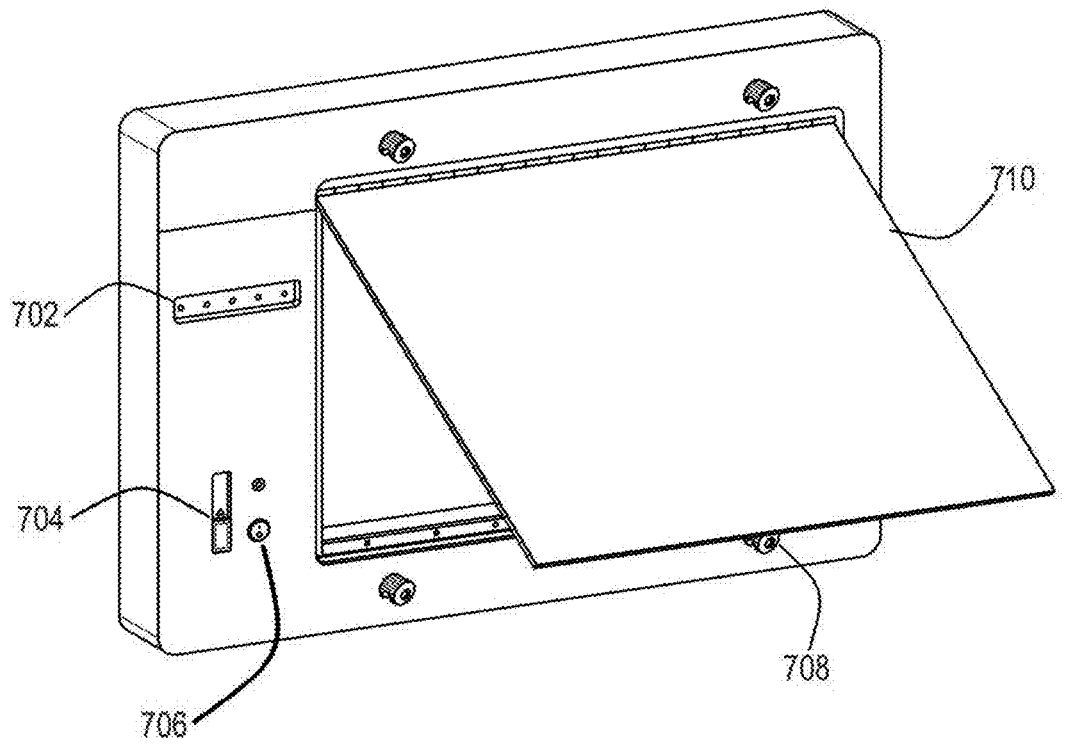
FIG. 7 depicts some aspects of a system for provisioning secure receipts in use.

Referring to FIG. 7, the secure delivery system 700 is designed to facilitate the receipt of packages at a premises. In certain aspects, the system includes a power, function and network indicator 702, sometimes known as a housing, configured to be mounted on a structure such as a front door, wall, or garage door. The housing 702 may be constructed from durable materials like steel or reinforced plastic to ensure security and longevity. In some aspects, the housing 702 may include adjustable flanges to accommodate different thicknesses of the structure, allowing for versatile installation options.

The front and back housing portions again present opposing, parallel flange surfaces that are free to translate until they sit flush with one another. Fasteners 706, working in concert with screws 708, are advanced to squeeze the two housing portions together. As each fastener is tightened, gravity helps the rear housing settle while the threaded engagement pulls the front housing inward, so that the cooperating flange surfaces firmly sandwich the intervening structure and lock the assembly in place, without relying on hinge action.

In various aspects, the system incorporates an electronic locking mechanism 704 operable to selectively allow access to the housing 702. This mechanism may include a keypad and an RFID reader, enabling secure access through authentication data. The electronic locking mechanism 704 is controlled by a controller 706, which is configured to receive authentication data from a delivery agent. 704 is a lock that prevents the metal privacy door to open. Once locked it regents package delivery.

The controller 706 may be programmed to handle various authentication protocols, ensuring flexibility and security in operation.

In several aspects, the motorized door housing 710 is integrated with the housing 702. The motorized door housing 710 may be powered by a rechargeable battery, providing energy-efficient operation. The door 710 is designed to open and close automatically, facilitating the secure transfer of packages into the housing 702. In other aspects, the motorized door housing 710 may include a privacy screen 708 that prevents visual access to the interior of the premises, enhancing security and privacy.

In many aspects, the collapsible collection bag (not shown) is located within the housing 702. This bag may be removable, allowing for easy retrieval of packages and maintenance. The collection bag may be made from flexible, durable materials such as nylon or canvas, providing a secure and adaptable storage solution for various package sizes.

In certain aspects, the communication interface (not shown) is configured to communicate with a remote user device. This interface may include wireless communication capabilities, such as Wi-Fi or Bluetooth, enabling real-time notifications to the user regarding the status of package delivery. The communication interface may also receive commands from the user device to manually control the motorized door housing 710, providing additional flexibility and control.

In some aspects, the system may further comprise a sensor (not shown) configured to detect the presence of a package within the collection bag. This sensor may trigger the motorized door housing 710 to close once a package is detected, ensuring the security of the delivered items. The sensor may utilize technologies such as infrared or ultrasonic detection to accurately identify the presence of packages.

In various aspects, the system's components are designed to work in harmony, providing a seamless and secure package delivery experience. The integration of the electronic locking mechanism 704, motorized door housing 710, and communication interface ensures that the system is both user-friendly and secure. The use of durable materials and advanced technologies further enhances the system's reliability and effectiveness.

In several aspects, alternative embodiments of the system may include additional features or configurations. For example, the housing 702 may be equipped with solar panels to provide an alternative power source, or the motorized door housing 710 may be designed to accommodate larger package sizes. These variations allow the system to be tailored to specific user needs and environmental conditions.

In other aspects, the system may be integrated with existing smart home technologies, allowing for enhanced functionality and user interaction. This integration may include compatibility with voice-activated assistants or home automation systems, providing a comprehensive and modern solution for secure package delivery.

In many aspects, the secure delivery system 700 addresses significant real-world problems, such as package theft and delivery security. By providing a robust and adaptable solution, the system offers competitive advantages over existing technologies, ensuring that packages are delivered safely and securely to the intended recipient.

Figure 8:
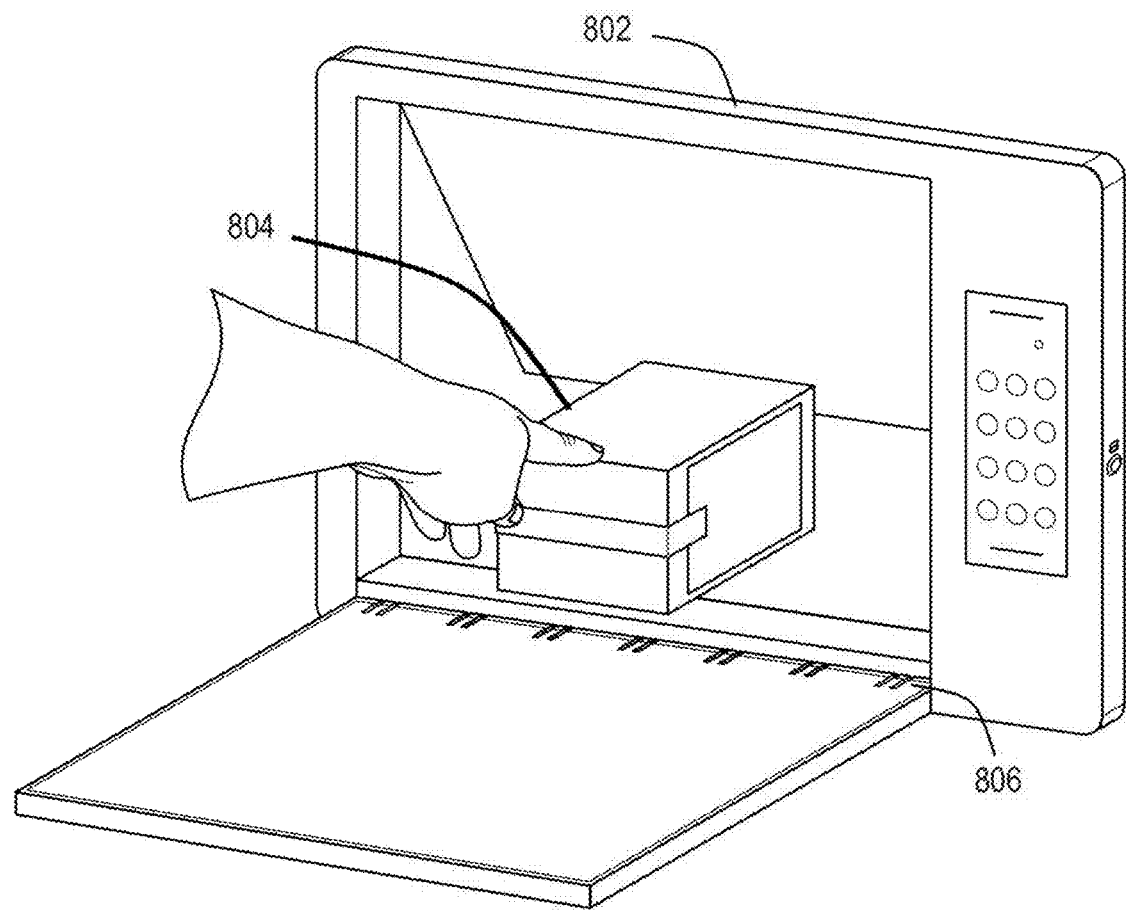
FIG. 8 depicts some aspects of a system for provisioning secure receipts installed in an example environment.

Referring to FIG. 8, the secure delivery system 802 is depicted as a comprehensive solution for receiving packages at a premises. In certain aspects, the system 802 may include a housing configured to be mounted on a structure such as a front door, wall, or garage door. The housing provides a secure enclosure for package delivery, ensuring that packages are protected from theft and environmental elements.

In some aspects, the system 802 features an electronic locking mechanism operable to selectively allow access to the housing. This mechanism may be controlled by a controller configured to receive authentication data, such as a code or signal from a delivery agent. The controller may process this data to determine whether to unlock the housing, thereby providing secure access for package delivery.

In various aspects, the motorized door housing 806 is integrated with the housing and may be operable to transition between open and closed positions. The motorized door housing 806 may include a privacy screen that prevents visual access to the interior of the premises, thereby maintaining the privacy and security of the occupants. The privacy screen may be coupled to a secondary locking mechanism, which is also controlled based on the authentication data received by the controller.

In several aspects, the system 802 includes a collapsible collection bag within the housing. This collection bag is designed to receive packages when the motorized door housing 806 is in the open position. The bag may be removable, allowing for flexibility in how packages are stored and retrieved. The collapsible nature of the bag ensures that it does not obstruct the operation of the motorized door housing 806.

In other aspects, the communication interface of the system 802 is configured to communicate with a remote user device. This interface may send notifications to the user regarding the status of package delivery, such as when a package has been successfully received or when the housing is accessed. Additionally, the communication interface may receive commands from the user device to manually control the motorized door housing 806, providing further flexibility and control over the delivery process.

In many aspects, the system 802 may include a sensor configured to detect the presence of a package within the collection bag. This sensor may trigger the motorized door housing 806 to close once a package is detected, ensuring that the package is securely stored within the housing. The sensor may also provide feedback to the controller, which can be used to update the user on the status of the delivery.

In certain aspects, the housing of the system 802 may include adjustable flanges to accommodate different thicknesses of the structure on which it is mounted. This feature allows the system to be easily installed on a variety of doors and walls, enhancing its versatility and applicability in different environments.

In some aspects, the electronic locking mechanism may include a keypad and an RFID reader. These components provide multiple methods for authentication, allowing delivery agents to access the housing using a code or an RFID tag. This flexibility in authentication, methods enhances the security and convenience of the system 802.

In various aspects, the motorized door housing 806 and the electronic locking mechanism may be powered by a rechargeable battery. This power source ensures that the system 802 remains operational even in the event of a power outage, providing reliable security for package deliveries.

In several aspects, the method for securely receiving packages at a premises may include mounting the housing on a structure, receiving authentication data from a delivery agent, and controlling the electronic locking mechanism to allow access based on the authentication data. The method may further include receiving a package into the collapsible collection bag and communicating with a remote user device to notify the user of the delivery status.

In other aspects, the method may include preventing visual access to the interior of the premises by using the privacy screen with the motorized door housing 806. The method may also involve controlling a secondary locking mechanism coupled to the privacy screen based on the authentication data, ensuring that the privacy and security of the premises are maintained.

In many aspects, the method may include receiving commands from the remote user device to manually control the motorized door housing 806 via the communication interface. This capability allows users to manage the delivery process remotely, providing convenience and flexibility.

In certain aspects, the method may include detecting the presence of a package within the collection bag using a sensor. This detection may trigger the motorized door housing 806 to close, securing the package within the housing. The sensor may also provide feedback to the controller, which can be used to update the user on the status of the delivery.

In some aspects, the method may include adjusting the flanges of the housing to accommodate different thicknesses of the structure. This adjustment allows the system 802 to be easily installed on a variety of doors and walls, enhancing its versatility and applicability in different environments.

In various aspects, the method may include entering a code on the keypad and detecting an authorized RFID tag with the RFID reader as part of the electronic locking mechanism. These authentication methods provide secure access to the housing, ensuring that only authorized delivery agents can access the system 802.

In several aspects, the method may include using a rechargeable battery to power the motorized door housing 806 and the electronic locking mechanism. This power source ensures that the system 802 remains operational even in the event of a power outage, providing reliable security for package deliveries.

Figure 9:
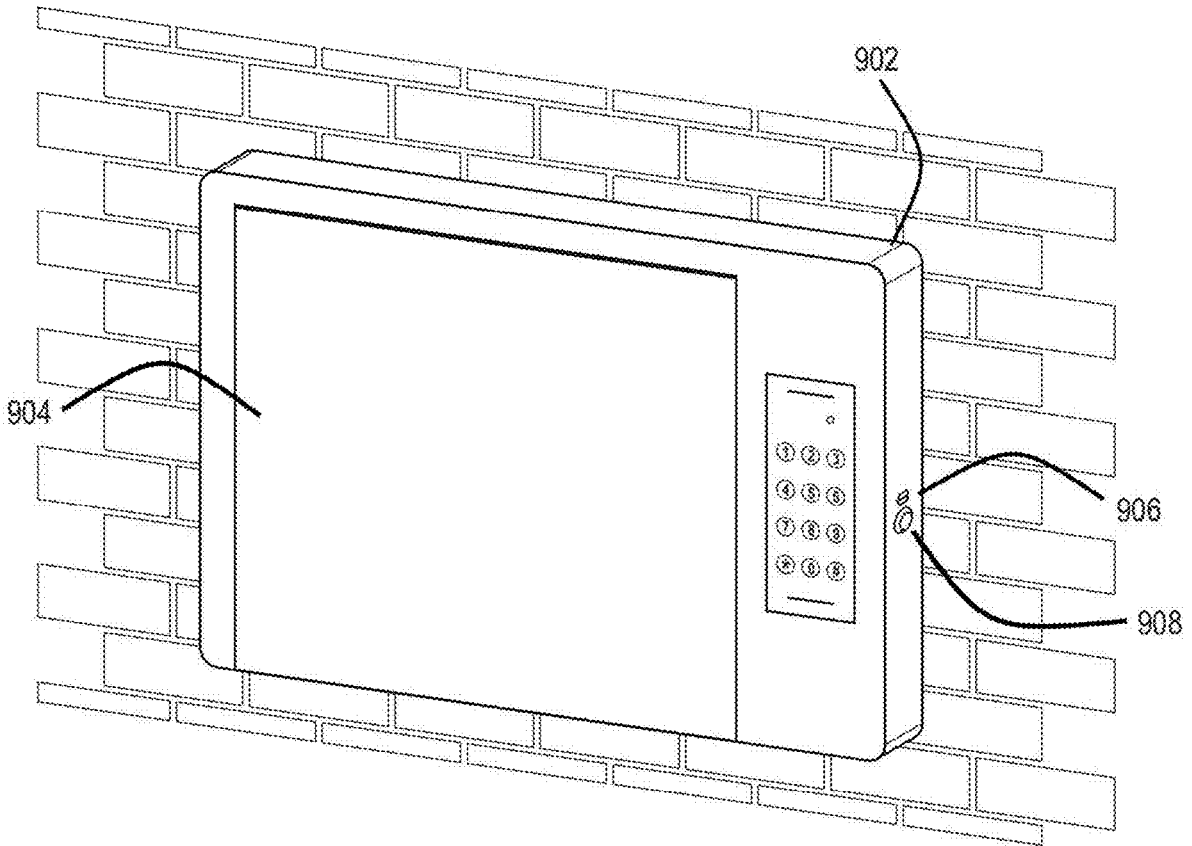
FIG. 9 depicts some aspects of a system for provisioning secure receipts installed in an example environment.

Referring to FIG. 9, the secure delivery system 900 is depicted as a comprehensive solution for receiving packages at a premises. In certain aspects, the system includes a housing 902 configured to be mounted on a structure such as a front door, wall, or garage door. The housing 902 may be constructed from durable materials like steel or reinforced plastic to ensure security and longevity. In some aspects, the housing 902 may include adjustable flanges to accommodate different thicknesses of the structure, providing flexibility in installation.

In various aspects, the system incorporates an electronic locking mechanism 904 operable to selectively allow access to the housing 902. This mechanism may include a keypad 906 and an RFID reader 908, enabling secure entry through authentication data. The keypad 906 may be used to enter a code, while the RFID reader 908 may detect authorized RFID tags, providing multiple layers of security. The electronic locking mechanism 904 may be powered by a rechargeable battery, ensuring continuous operation even during power outages.

In several aspects, the motorized door housing 910 is integrated with the housing 902. This door may include a privacy screen that prevents visual access to the interior of the premises, enhancing security. The privacy screen may be coupled to a secondary locking mechanism controlled based on the authentication data, ensuring that only authorized individuals can access the contents within.

In other aspects, the system features a controller configured to receive authentication data and to control the electronic locking mechanism 904. The controller may process inputs from the keypad 906 and RFID reader 908, determining whether to grant access based on pre-set criteria. This controller may also interface with a communication interface, which is configured to communicate with a remote user device. This communication interface may notify the user of the status of package delivery, providing real-time updates and allowing for remote control of the motorized door housing 910.

In many aspects, the collapsible collection bag within the housing 902 is designed to receive packages securely. This bag may be removable, allowing for easy retrieval of packages and providing flexibility in use. The collection bag may be made from materials such as nylon or canvas, offering durability and protection for the contents.

In certain aspects, the system may further comprise a sensor configured to detect the presence of a package within the collection bag. This sensor may trigger notifications to the user via the communication interface, ensuring that the user is aware of any deliveries. The sensor may also initiate the closing of the motorized door housing 910 once a package is detected, maintaining security.

In some aspects, the system's components are designed to work seamlessly together, providing a robust and secure solution for package delivery. The integration of the electronic locking mechanism 904, motorized door housing 910, and communication interface ensures that the system is both user-friendly and secure. The use of durable materials and advanced technology components further enhances the system's reliability and effectiveness.

In various aspects, the system may be configured to operate in different environments, adapting to various installation scenarios. The adjustable flanges of the housing 902 and the flexibility of the collapsible collection bag allow the system to be tailored to specific needs, making it suitable for a wide range of applications.

In several aspects, the system's design emphasizes ease of use and security, providing a comprehensive solution for modern package delivery challenges. The combination of physical security features and advanced technology components ensures that the system meets the demands of today's users, offering peace of mind and convenience.

In other aspects, the system may include additional features such as integration with smart home systems or compatibility with existing security protocols. These enhancements may further extend the system's capabilities, providing users with a versatile and adaptable solution for secure package delivery.

In many aspects, the secure delivery system 900 represents a significant advancement in package delivery technology, addressing common challenges and providing a reliable and secure solution for users. The system's innovative design and comprehensive feature set make it a valuable addition to any premises, offering enhanced security and convenience for package deliveries.

Figure 10:
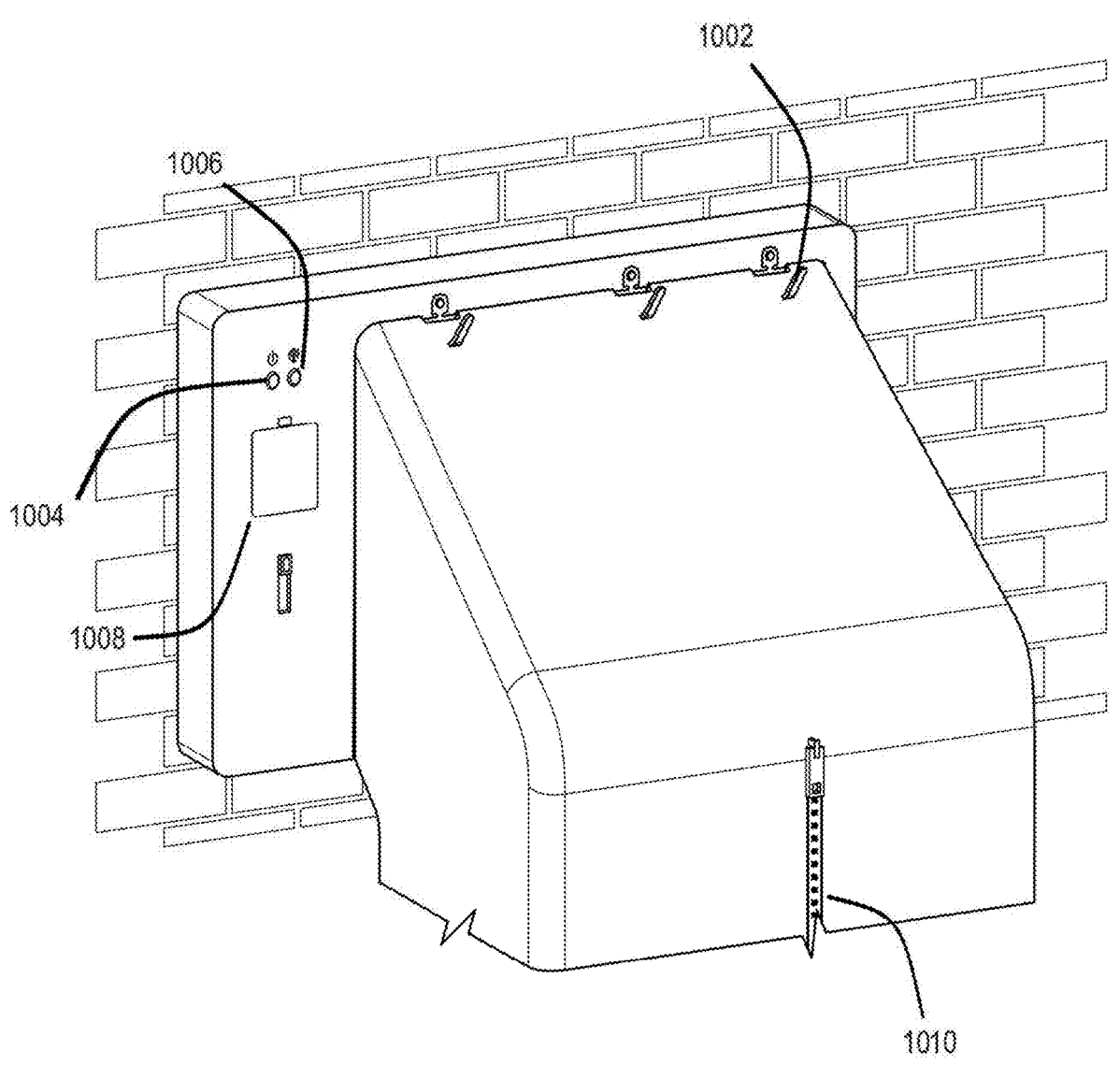
FIG. 10 depicts some aspects of a system for provisioning secure receipts installed in an example environment.

Referring to FIG. 10, the secure delivery system 1000 is depicted, illustrating a comprehensive solution for receiving packages at a premises. In certain aspects, the system includes a housing, also known as a set of one or more individual clips, 1002 configured to be mounted on a structure such as a front door, wall, or garage door. The housing 1002 may be constructed from durable materials, such as metal or reinforced plastic, to ensure security and weather resistance.

In some aspects, the housing 1002 integrates a motorized door housing, which may include a privacy screen to prevent visual access to the interior of the premises. This motorized door housing is operable via an electronic locking mechanism 1004, which selectively allows access based on authentication data. The electronic locking mechanism 1004 may include a keypad and an RFID reader, providing multiple authentication methods for enhanced security.

In various aspects, a controller 1006 is configured to receive authentication data from a delivery agent. The controller 1006 may process this data to control the electronic locking mechanism 1004, ensuring that only authorized access is granted. The controller 1006 may be programmed using various algorithms to enhance security protocols and may be updated remotely via a communication interface.

In several aspects, the system includes a collapsible collection bag 1008 within the housing 1002. This collection bag 1008 is designed to receive packages securely and may be removable for easy access and maintenance. The bag may be made from flexible, durable materials such as nylon or canvas, allowing it to accommodate packages of various sizes.

In other aspects, the communication interface 1010 is configured to communicate with a remote user device. This interface 1010 may include wireless communication capabilities, such as Wi-Fi or Bluetooth, to notify users of package delivery status. The communication interface 1010 may also receive commands from the user device to manually control the motorized door housing, providing flexibility and convenience.

In many aspects, the housing 1002 may include adjustable flanges to accommodate different thicknesses of the structure on which it is mounted. This feature allows for easy installation and adaptability to various environments. The system may also include a sensor configured to detect the presence of a package within the collection bag 1008, triggering notifications to the user.

In certain aspects, the motorized door housing and the electronic locking mechanism 1004 are powered by a rechargeable battery, ensuring continuous operation even during power outages. The battery may be housed within the system and designed for easy replacement or recharging.

In some aspects, the system's components are designed to integrate seamlessly with existing infrastructure, providing a user-friendly and secure solution for package delivery. The system may be compatible with various standards and technologies, ensuring broad applicability and ease of use.

In various aspects, the secure delivery system 1000 offers a robust solution for modern package delivery challenges, addressing issues such as theft and unauthorized access. The system's design emphasizes security, flexibility, and user convenience, making it suitable for a wide range of applications and environments.

Figure 11:
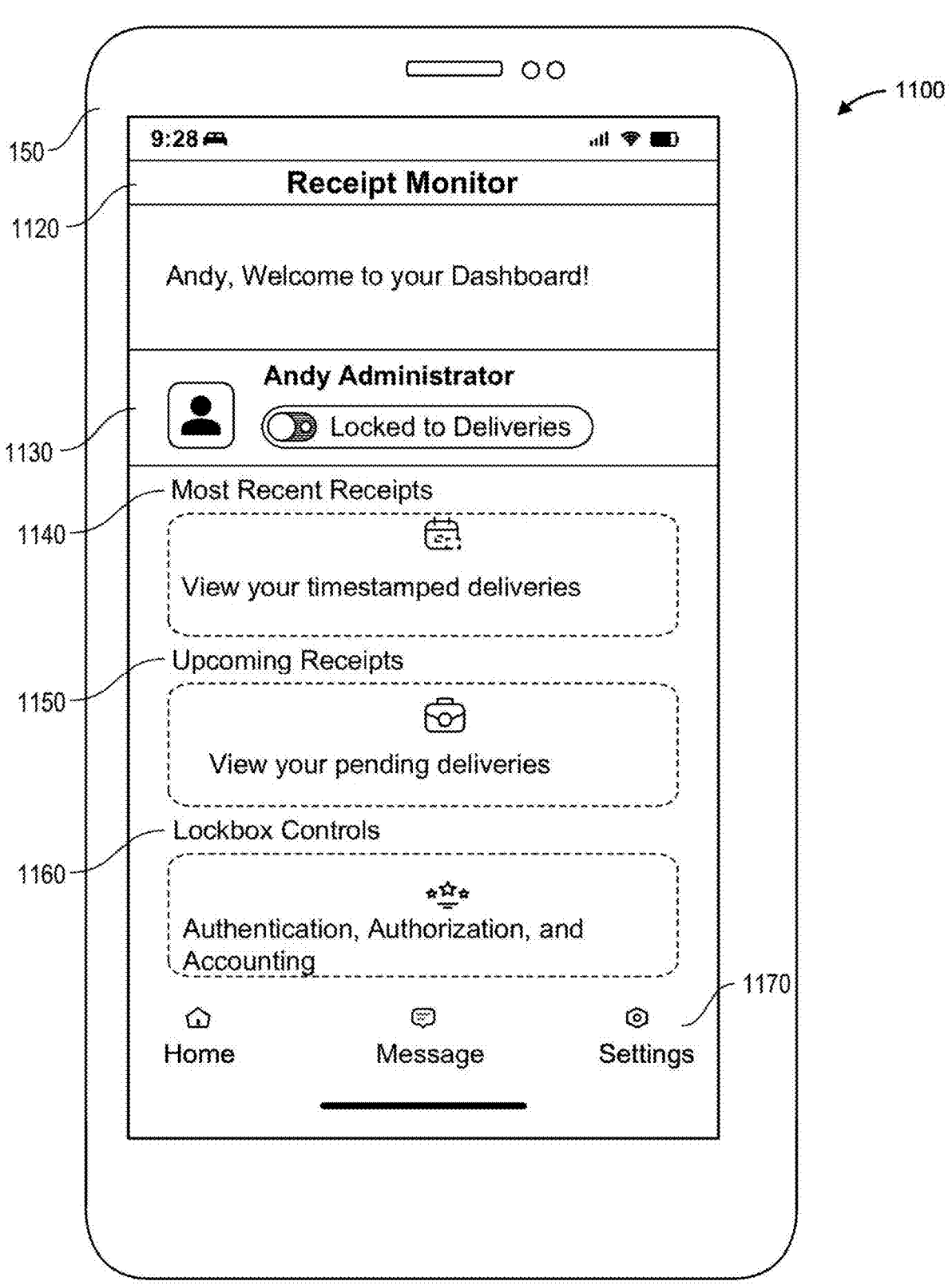
FIG. 11 depicts an example computer system and application interface on which illustrative embodiments may be implemented.

Referring to FIG. 11, which illustrates a user interface for a receipt monitoring system 1100, the system may be implemented on a mobile device or tablet. In certain aspects, the interface is designed to provide users with comprehensive control and monitoring of package deliveries. The display 1120 prominently features a welcome message, "Andy, Welcome to your Dashboard!" which may personalize the user experience by addressing the user by name.

In some aspects, the user profile section 1130 includes an identifier, such as "Andy Administrator," and a status indicator, "Locked to Deliveries." This section may allow users to manage their delivery preferences and security settings. The status indicator may reflect the current state of the delivery system, providing real-time updates on whether the system is accepting deliveries.

In various aspects, the interface includes sections for "Most Recent Receipts" 1140, "Upcoming Receipts" 1150, and "Lockbox Controls" 1160. Each section may be interactively designed to allow users to access detailed information and perform specific actions. The "Most Recent Receipts" section may display a list of timestamped deliveries, enabling users to review past transactions. The "Upcoming Receipts" section may provide information on pending deliveries, allowing users to anticipate and prepare for incoming packages.

In several aspects, the "Lockbox Controls" section 1160 may offer functionalities related to authentication, authorization, and accounting. This section may include options for managing access credentials, setting security protocols, and reviewing transaction logs. The integration of these controls may enhance the security and efficiency of the delivery system.

In other aspects, the navigation bar 1170 at the bottom of the interface may include icons for "Home," "Message," and "Settings." These icons may facilitate easy navigation between different sections of the application, allowing users to customize their experience, communicate with service providers, and adjust system settings.

In many aspects, the receipt monitoring system 1100 may be configured to communicate with the secure delivery system described in the claims. The communication interface may enable the system to receive updates and commands from a remote user device, as outlined in claim 5. This integration may allow users to manually control the motorized door housing and receive notifications about package delivery status.

The system may include a collapsible collection bag within the housing, as described in claim 1, which may be monitored and managed through the user interface. The interface may provide alerts when the collection bag is full or when a package has been successfully delivered.

In certain aspects, the system may be powered by a rechargeable battery, as mentioned in claim 10, ensuring continuous operation even in the event of a power outage. The user interface may display battery status and provide alerts when recharging is necessary.

In some aspects, the system may include a privacy screen, as described in claim 3, which may be controlled through the interface. Users may have the option to activate or deactivate the privacy screen, enhancing the security of the delivery process.

In various aspects, the system may be mounted on different structures, such as a front door, wall, or garage door, as outlined in claim 2. The user interface may provide configuration options to accommodate these different mounting scenarios, ensuring optimal performance and user satisfaction.

In several aspects, the system may include a sensor to detect the presence of a package within the collection bag, as described in claim 6. The interface may display sensor readings and provide alerts when a package is detected, allowing users to take timely action.

In other aspects, the system may include adjustable flanges to accommodate different thicknesses of the structure, as mentioned in claim 7. The user interface may offer guidance on adjusting these flanges, ensuring a secure and stable installation.

In many aspects, the system may include a keypad and an RFID reader, as described in claim 8, for enhanced security and access control. The user interface may allow users to manage access codes and RFID credentials, providing a seamless and secure delivery experience.

Overall, the receipt monitoring system 1100 may offer a comprehensive and user-friendly interface for managing secure package deliveries. The integration of various features and controls may enhance the security, efficiency, and convenience of the delivery process, providing users with peace of mind and control over their deliveries.

CONCLUSION

For clarity of explanation, the above description has focused on a representative sample of all possible embodiments, a sample that teaches the principles of the invention and conveys the best mode contemplated for carrying it out. In general, a receptacle has been disclosed which is integrated with existing home entry points with rechargeable door power storage, pin codes, and a second privacy screen or smart device control application. The invention is not limited to the described embodiments. Well known features may not have been described in detail to avoid unnecessarily obscuring the principles relevant to the claimed invention. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed alternatives, variations, modifications, and equivalents are within the literal scope of the following claims, and others are equivalent. The claims may be practiced without some or all of the specific details described in the specification. In many cases, method steps described in this specification can be performed in different orders than that presented in this specification, or in parallel rather than sequentially, or in different computers of a computer network, rather than all on a single computer. It is to be understood that the present technology contemplates that, to the extent possible, one or more features of any implementation can be combined with one or more features of any other implementation.

While the above description details certain embodiments of the invention and describes the best mode contemplated, no matter how detailed the above appears in text, the invention can be practiced in many ways. Therefore, implementation details may vary considerably while still being encompassed by the invention disclosed herein. Particular terminology used when describing certain features or aspects of the invention should not be taken to imply that the terminology is being redefined herein to be restricted to any specific characteristics, features, or aspects of the invention with which that terminology is associated.

Any specific manifestations of these and other similar example processes are not intended to be limiting to the disclosure. Any suitable manifestation of these and other similar example processes can be selected within the scope of the illustrative embodiments.

Thus, a computer-implemented method, system or apparatus, and computer program product are provided in the illustrative embodiments for SYSTEMS AND METHODS FOR PROVISIONING SECURE RECEIPTS IN COMPACT ENVIRONMENTS.

and other related features, functions, or operations. Where an embodiment or a portion thereof is described with respect to a type of device, the computer-implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser, or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present disclosure may be a system, a method, and/or a computer program product at any possible technical detail level of integration. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on a dedicated system or user's computer, partly on the user's computer or dedicated system as a stand-alone software package, partly on the user's computer and partly on a remote computer or entirely on the remote computer or server, etc. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

What is claimed is:

1. A secure delivery system for receiving packages at a premises, comprising:
  a housing configured to be mounted on a structure and including an exterior mounting flange and an interior mounting flange that are adjustably spaced apart to accommodate structures of different thickness;
  an electronic locking mechanism disposed within the housing and operable to selectively allow access to the housing;
  a motorized door housing pivotably mounted to the housing, the motorized door housing including a privacy screen that is releasably secured;
  a controller configured to:
    receive authentication data;
    unlock the electronic locking mechanism when the authentication data is verified;
    actuate a drive unit to move the motorized exterior door from a closed position to an open position;
    a collapsible, collection bag located inwardly of the motorized exterior door and arranged to be accessed when the motorized exterior door is opened;
    detect the presence of a package within the collection bag;
    responsive to the detection of a delivery, autonomously perform closing the motorized door housing and re-locking the electronic locking mechanism; and
    a communication interface configured to exchange status information and commands with a remote user device.

2. The system of claim 1, wherein the structure includes a front door, a wall, or a garage door.

3. The system of claim 1, wherein the motorized door housing comprises a privacy screen that prevents visual access to an interior of a premises.

4. The system of claim 3, wherein the privacy screen is coupled to a secondary locking mechanism controlled based on authentication data.

5. The system of claim 1, wherein the communication interface is configured to receive commands from a remote user device to manually control the motorized door housing.

6. The system of claim 1, further comprising a sensor configured to detect a presence of a package within a collection bag.

7. The system of claim 1, wherein the housing includes adjustable flanges to accommodate different thicknesses of a structure.

8. The system of claim 1, wherein the electronic locking mechanism includes a keypad and an RFID reader.

9. The system of claim 1, wherein the collapsible collection bag is removable.

10. The system of claim 1, wherein the motorized door housing and the electronic locking mechanism are powered by a rechargeable battery.

11. A method for securely receiving packages at a premises, comprising:
  mounting a housing on a structure by adjustably spacing an exterior mounting flange and interior mounting flange of the housing to accommodate structures of different thickness;
  operating a controller within the housing to receive authentication data and, when the authentication data is verified, unlocking an electronic locking mechanism;
  actuating, by the controller, a drive unit to pivot a motorized door housing from a closed position to an open position, the motorized door housing including a privacy screen that is releasably secured by a secondary locking mechanism;
  contemporaneously deploying a collapsible, removable collection bag from a collapsed state to an expanded state inwardly of the motorized door housing as the motorized door housing opens;
  passively receiving, by the expanded collection, a package deposited through the motorized door housing;
  detecting, the presence of a package within the collection bag;
  in response to the detection of a delivery, autonomously perform closing the motorized door housing back to the closed position, re-securing the secondary locking mechanism, re-locking the electronic locking mechanism, and folding the collection bag toward the collapsed state; and
  communicating, via a communication interface, status information regarding the delivery to a remote user device.

12. The method of claim 11, wherein the structure includes a front door, a wall, or a garage door.

13. The method of claim 11, further comprising preventing visual access to the interior of the premises by including a privacy screen with the motorized door housing.

14. The method of claim 13, further comprising controlling a secondary locking mechanism coupled to the privacy screen based on the authentication data.

15. The method of claim 11, further comprising receiving commands from the remote user device to manually control the motorized door housing via a communication interface.

16. The method of claim 11, further comprising detecting the presence of a package within the collection bag using a sensor.

17. The method of claim 11, further comprising adjusting flanges of the housing to accommodate different thicknesses of a structure.

18. The method of claim 11, further comprising entering a code on a keypad and detecting an authorized RFID tag with an RFID reader as part of an electronic locking mechanism.

19. The method of claim 11, wherein the collapsible collection bag is removable.

20. The method of claim 11, wherein the motorized door housing and the electronic locking mechanism are powered by a rechargeable battery.

* * * * *